United States Patent
Han et al.

(10) Patent No.: US 9,387,882 B2
(45) Date of Patent: Jul. 12, 2016

(54) APPARATUS AND METHOD FOR FAULT TOLERANT TRAJECTORY GENERATION A LEFT-RIGHT INDEPENDENT ACTIVE FRONT STEERING VEHICLE

(71) Applicant: Kyungpook National University Industry-Academic Cooperation Foundation, Daegu (KR)

(72) Inventors: Dong Seog Han, Daegu (KR); In Seok Yang, Daegu (KR); Hee Chang Lee, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 0 days.

(21) Appl. No.: 14/708,217

(22) Filed: May 9, 2015

(65) Prior Publication Data
US 2015/0344070 A1     Dec. 3, 2015

(30) Foreign Application Priority Data
May 9, 2014    (KR) ........................ 10-2014-0055927

(51) Int. Cl.
*B62D 15/00* (2006.01)
*B62D 15/02* (2006.01)

(52) U.S. Cl.
CPC .............. *B62D 15/029* (2013.01); *B62D 15/00* (2013.01); *B62D 15/021* (2013.01)

(58) Field of Classification Search
CPC .... B62D 15/02; B62D 15/029; B62D 15/021; G01C 21/20
USPC ............. 701/41–44, 400, 411–414, 416, 417; 180/408, 411–413
See application file for complete search history.

(56) References Cited

U.S. PATENT DOCUMENTS

| | | | | |
|---|---|---|---|---|
| 5,143,400 A * | 9/1992 | Miller | .................... | B62D 17/00 180/413 |
| 6,272,409 B1 * | 8/2001 | Elwood | .................... | B62D 7/20 180/435 |
| 6,363,305 B1 * | 3/2002 | Kaufmann | ............. | B62D 6/008 180/402 |
| 7,077,232 B2 * | 7/2006 | Correia | .................... | B62D 7/20 180/410 |
| 7,912,606 B2 * | 3/2011 | Auguet | .................. | B62D 5/003 180/408 |
| 8,068,955 B2 * | 11/2011 | Yanagi | .................. | B62D 7/148 280/86.758 |
| 8,346,434 B2 * | 1/2013 | Tsukasaki | .............. | B62D 6/006 280/5.51 |

(Continued)

FOREIGN PATENT DOCUMENTS

KR    2012-0106211 A    9/2012

OTHER PUBLICATIONS

Notice of Allowance dated Jul. 12, 2015 issued by the Korean Patent Office in Korean Patent Application No. 10-2014-0055927 which the present application claims priority to.

*Primary Examiner* — Thomas Tarcza
*Assistant Examiner* — Tyler J Lee
(74) *Attorney, Agent, or Firm* — Porzio, Bromberg & Newman, P.C.

(57) ABSTRACT

The present description relates to an apparatus and method for fault tolerant trajectory generation of a left-right independent active front steering vehicle that calculates a driving optimal route of a vehicle considering turning radius increase of a vehicle that is generated due to fault management because of a fault generated on any one of steering device between a left or right steering device of a vehicle and turning possible level of a surrounding road.

6 Claims, 4 Drawing Sheets

(56) References Cited

U.S. PATENT DOCUMENTS

| | | | | |
|---|---|---|---|---|
| 8,364,347 B2 * | 1/2013 | Tsukasaki | ............ | B62D 5/0418 180/444 |
| 2005/0072621 A1 * | 4/2005 | Hara | ...................... | B62D 1/163 180/444 |
| 2008/0167778 A1 * | 7/2008 | Tsukasaki | ............ | B62D 5/0418 701/41 |
| 2008/0177442 A1 * | 7/2008 | Tsukasaki | .............. | B62D 6/006 701/38 |
| 2015/0019064 A1 * | 1/2015 | Shin | ...................... | B60W 30/00 701/25 |

* cited by examiner

APPARATUS AND METHOD FOR FAULT TOLERANT TRAJECTORY GENERATION A LEFT-RIGHT INDEPENDENT ACTIVE FRONT STEERING VEHICLE

CROSS-REFERENCE TO RELATED APPLICATION(S)

This application claims the benefit under 35 USC 119(a) of Korean Patent Application No. 10-2014-0055927 filed on May 9, 2014 in the Korean Intellectual Property Office, the entire disclosure of which is incorporated herein by reference for all purposes.

BACKGROUND

Field

The following description relates to an apparatus and method for fault tolerant trajectory generation of a left-right independent active front steering vehicle, and an apparatus and method for generation and guidance of a route considering an increase of a turning radius of a vehicle due to a fault management when a fault is generated in any one of steering apparatus among a left or right wheel steering apparatus of a vehicle.

Concerning the steering control system in vehicles, various steer-by-wire (hereinafter, referred to as 'SBW') vehicle steering systems that can freely determine steering reaction torque (or steering reaction force) applied to a steering wheel and the steering angle of a vehicle that is steered have been proposed. The SBW system is an electric actuator that measures the movement of a handle and forms with a method of steering the wheel. Further, electric control module coverts an angle of the wheel by transmitting information of the handle actuator to other actuators in a steering unit.

Those SBW vehicle steering systems for vehicles generally use a mechanical backup system at the middle of a column shaft for mechanically coupling steering input unit and output unit, using a mechanism backup system, in a back-up mode (or a fail-safe mode) that is operated by a breakdown in an SBW system. Recently, an apparatus that electrically controls a left-right independent active steering and operates a backup system by replacing the side with the other side when fault is generated on one side like a Korean Patent Publication No. 10-2012-0106211.

However, a vehicle brake operating with a back-up operating mode calculates a very big input value to reduce the error due to fault generation, thereby there may be a problem in securing safety for the vehicle and comparing with a normally operating steering control system, the turning radius of a vehicle may increase.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples overcome the above disadvantages and other disadvantages not described above. Also, the examples are not required to overcome the disadvantages described above, and an example potentially does not overcome any of the problems described above.

In an effort to solve the afore-mentioned problem, an apparatus and method for fault tolerant trajectory generation of a left-right independent active front steering vehicle that can obtain stable turning of a vehicle considering turning function degradation due to fault management of a SBW system.

Further the present disclosure relates to an apparatus for fault tolerant trajectory generation of a left-right independent active front steering vehicle comprising a steering system fault management unit configured to control a steering angle of the other side wheel when determined a steering unit of one side has broke down, a turning radius calculating unit configured to calculate a maximum turning radius value of a vehicle based on a steering angle information controlled by the steering system fault management unit, a radius information acquiring unit configured to calculate a minimum turning radius value of each roads by acquiring road information of surrounding region and driving direction of a current vehicle, an optimal route calculation unit configured to determine a vehicle passable road by comparing a maximum turning angle value that is acquired from the turning radius determining unit and a minimum turning radius value of each road that is acquired from the radius information acquiring unit, and calculates an optimal driving route of a vehicle by selecting part of a determined passable road.

The steering angle is adjusted through controlling a steering angle of the other wheel to satisfy an ackerman condition according to a current steering angle information of one side vehicle.

The turning radius calculating unit further calculates a safety information of a vehicle according to each turning radius.

The radius information acquiring unit may include at least one of GPS tracking method, cell tracking method, network tracking method, and MSP hybrid tracking method to determine a current vehicle location.

The radius information acquiring unit is configured to determine a current vehicle location, and acquire information of surrounding geography and road from a selected at least one of navigation, road transportation information server, and stored map data according to the determined location, and calculates a turning radius of each roads.

The apparatus for fault tolerant trajectory generation of a left-right independent active front steering vehicle of a present disclosure may further comprise a display unit that displays a route that is calculated from the optimal route calculating unit and display selected among any one or more than one of vehicle fault information, maximum turning radius safety information of a vehicle according to a turning radius.

The method for fault tolerant trajectory generation of a left-right independent active front steering vehicle comprising steps of determining whether a steering angle value of both side wheel that is calculated from an inputted steering angle is identical with an actually steered steering angle of a both front vehicle wheel when steering wheel is input through a steering wheel, and determines as a fault state if they are not identical;

Calculating a maximum turning radius value of a vehicle through controlling a steering angle of the other wheel to satisfy the ackerman condition according to a current steering angle information of the one side wheel when a steering unit of one side wheel is determined as a fault state and through acquiring steering information of both side wheel;

Acquiring a minimum turning radius value of a required road to pass each road through determining current vehicle location and acquiring information of a surrounding geography and road based on the determined location and calculating a turning radius of each roads; and, Calculating an optimal driving route of a vehicle through determining a vehicle passable road by comparing a maximum turning radius value of the acquired vehicle and a minimum turning radius value to pass the acquired each roads and selecting a determined passable road.

The apparatus and method for fault tolerant trajectory generation of a left-right independent active front steering vehicle may secure turning safety of a vehicle applying increase of turning radius due to a fault management of a SBW system when generating a vehicle route.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Certain examples are now described in greater detail with reference to the accompanying drawings.

Figure 1:
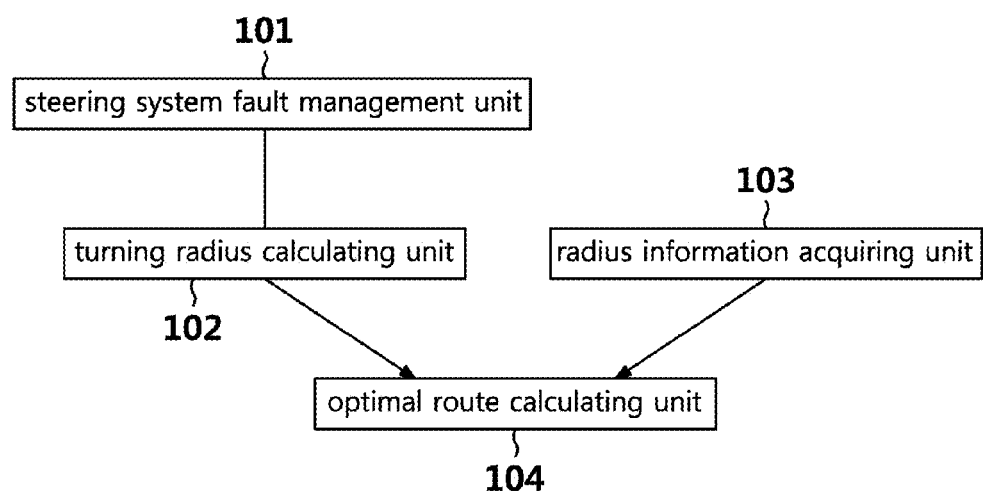
FIG. 1 is a diagram of an apparatus for fault tolerant trajectory generation of a left-right independent active front steering vehicle according to the present description.

FIG. 1 is a diagram of an apparatus for fault tolerant trajectory generation of a left-right independent active front steering vehicle according to the present description.

As shown in FIG. 1, an apparatus for fault tolerant trajectory generation of a left-right independent active front steering vehicle includes a steering system fault management unit 101; a turning radius calculating unit 102; a radius information acquiring unit 103; and an optimal route calculating unit 104.

The steering system fault management unit 101 determines whether a steering angle value of both wheels that is calculated from an input steering angle when a steering angle is input through a steering wheel by a driver and an actually steered steering angle of vehicle both front wheel are identical and determines as fault state if they are not identical.

The type of the fault state are a) when an output value is fixed with an output value generated due to fault (Lock in Place), b) when an output value is fixed at an equilibrium point (Float), c) when an output value reaches a maximum limiting value (Hard Over), d) an output value efficiency is smaller than an expected value (Loss of Effectiveness) and etc.

When any one side wheel steering unit of a left-right independent active steering control system is determined as a fault state by the steering system fault management unit 101, the stress that a rigid body vehicle receives is reduced through controlling a steering angle of the other side wheel to satisfy an ackerman condition according to a current steering angle information of the one side wheel.

Accordingly, a turning radius of a vehicle increases as the steering system fault management unit 101 controls the steering angle of the other side wheel according to a steering information of one side wheel.

The turning radius calculating unit 102 calculates a maximum turning radius value of a vehicle through acquiring information of a fault state detected at the steering system fault management unit 101 and steering information of both side wheels.

A maximum turning radius value of a vehicle calculated in the turning radius calculating unit 102 is a maximum angle that is controllable to left/right sides according to a location of a wheel of straight state.

The information generated in the turning radius calculating unit 102 may further include safety information of a vehicle according to each turning radius value of a vehicle. Safety information of a vehicle herein includes route information that a vehicle can safely turn based on the following [Expression 1].

The radius information acquiring unit 103 determines a current vehicle location and acquires information of surrounding geography and road from various sources such as navigation, road transportation server, stored map data and etc. based on the determined location and acquires a minimum turning radius value of a necessary road to pass each roads by calculating a turning radius of each roads.

The minimum turning radius value of a road acquired from the radius information acquiring unit 103 is a minimum turning radius value required for a vehicle to pass a road.

The radius information acquiring unit 103 may further include any one or more of location tracking modules such as a GPS (Global positioning system) tracking method, a cell tracking method, a network tracking method, a MSP Hybrid tracking method to determine current location of a vehicle.

The optimal route calculation unit 104 determines a vehicle passable road by comparing a maximum turning radius value of the vehicle acquired from the turning radius calculating unit 102 and a minimum turning radius value to pass each road acquired from the turning information acquiring unit 103 and calculates an optimal driving road of a vehicle by selecting a determined passable road.

An apparatus for fault tolerant trajectory generation of a left-right independent active front steering vehicle according to a present description displays a route that is calculated from the optimal route calculation unit 104 and may further include a display unit (not shown) configured to display a vehicle fault information and a maximum turning radius.

Figure 2:
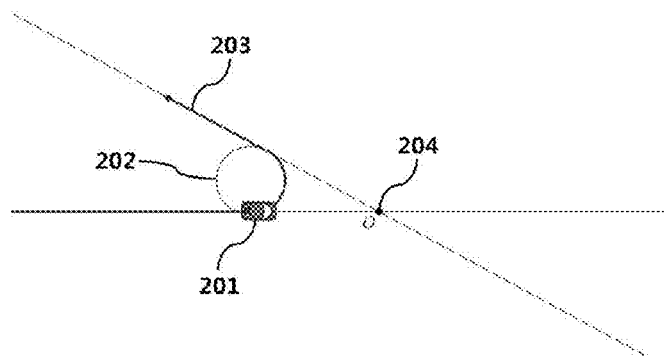
FIG. 2 is a diagram of a route generation of a vehicle according to a normal operation of a left-right independent active steering vehicle.

FIG. 2 is a diagram of a vehicle route generation according to a normal operation of a left-right independent active steering control system of a present description.

FIG. 2 illustrates a driving vehicle 201, a turning radius according to a normal operation of the left-right independent active steering control system, generation route according to the left-right independent active steering control system, a starting point for route calculation 204.

Figure 3:
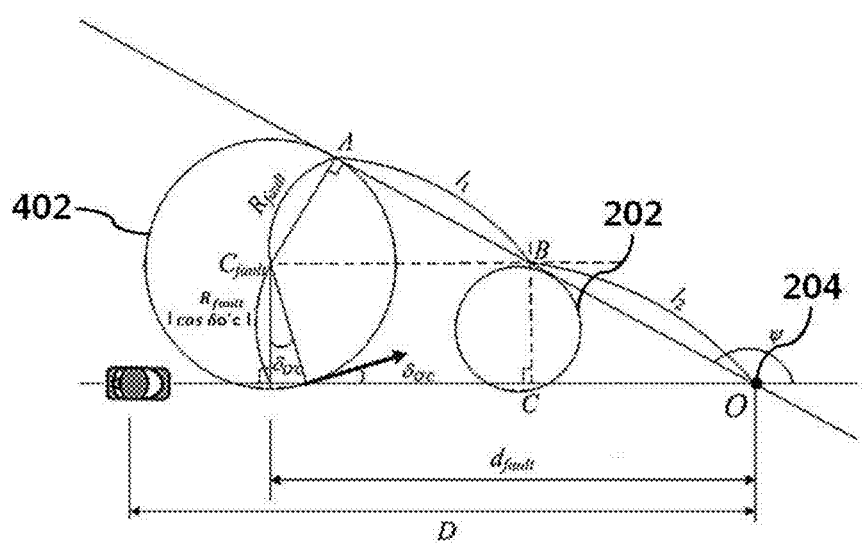
FIG. 3 a diagram of an interpretation method for route calculation method according to an embodiment of the present description.

FIG. 3 a diagram of an interpretation method for route calculation method according to an embodiment of the present description.

Referring to FIG. 3, a turning radius greatly increased when a fault management of a left-right independent active steering control system applied maximum turning radius of a vehicle 402 is compared to a turning radius 202 according to the left-right independent active steering control system.

The optimal route calculation unit 104 acquires a turning radius 202 according to a normal operation of a steering control system, a maximum turning radius of vehicle 402 applied with a fault management of the left-right independent active steering control system provided from a turning radius calculating unit 102, and information provided from a radius information acquiring unit 103, and calculates an optimal route of a vehicle using the following expression 1.

$$\begin{cases} (-R_{fault}|\cos\delta_{O'C}||\cot\psi| - R_{fault}|\csc\psi|, R_{fault}|\cos\delta_{O'C}|), \text{ if } D \geq d_{fault} \\ (R_{fault}|\cos\delta_{O'C}||\cot\psi| + R_{fault}|\csc\psi|, -R_{fault}|\cos\delta_{O'C}|), \text{ if } D < d_{fault} \end{cases}$$ [Expression 1]

Herein, Rfault is a turning radius of a vehicle after fault management, $\delta O'C$ is a vehicle direction angle of a time unit, $\Psi$ is a difference between a steering angle of a current vehicle and turning standard route steering angle, dfault and D are respectively a distance from a starting point to an X coordinate of a turning center and a distance from a starting point to a vehicle.

Figure 4A:
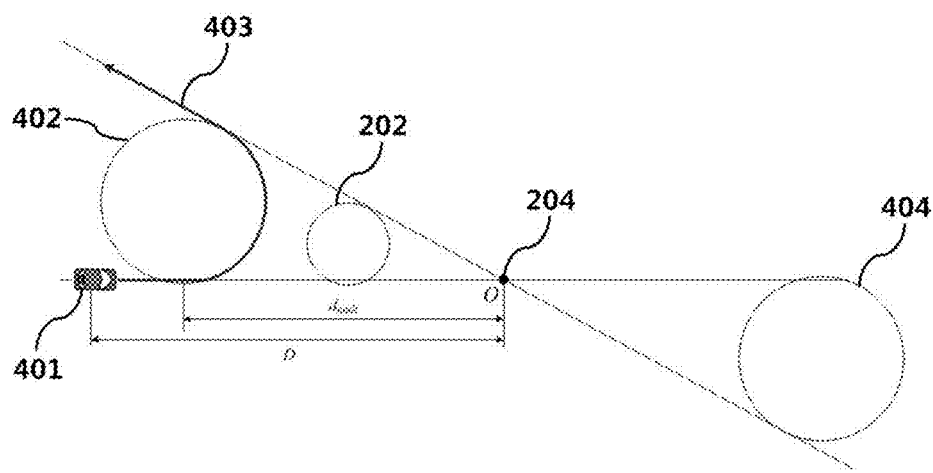
FIG. 4A is an exemplary diagram of an optimal route generation considering turning radius increase when fault is generated in a left-right independent active front steering vehicle of the present description.

FIG. 4A is an exemplary diagram of an optimal route generation considering turning radius increase when fault is generated in a left-right independent active front steering vehicle of the present description.

Referring to FIG. 4A, the optimal route calculation unit 104 determines that a maximum turning radius 402 of a vehicle that satisfies the expression 1, $D \geq d_{fault}$, and applied with a fault management of vehicle steering control system can pass and guides a vehicle 401 to drive on the related route 403, because a distance (D) from a starting point 204 to a current vehicle 401 is further remote than a distance ($d_{fault}$) from a starting point 204 to a turning start point.

Figure 4B:
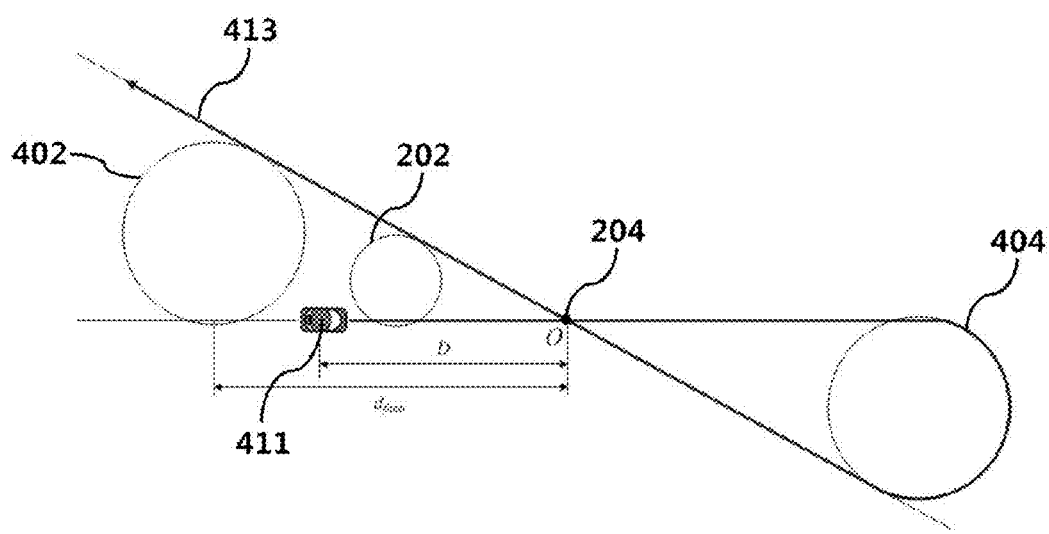
FIG. 4B is an exemplary diagram of an optimal route generation considering an increase of a turning radius when fault is generated in a left-right independent active front steering control system.

FIG. 4B is an exemplary diagram of an optimal route generation considering an increase of a turning radius when fault is generated in a left-right independent active front steering control system.

Referring to FIG. 4B, the optimal route calculation unit 104 satisfies the expression 1, $D \geq d_{fault}$ because a distance (D) from a starting point 204 to a current vehicle 401 is further remote than a distance ($d_{fault}$) from a starting point 204 to a turning start point and determines that a vehicle cannot pass due to the turning radius 202 according to a normal operation of the left-right independent active steering control system and a maximum turning radius 402 of a vehicle applied with a fault management of a steering control system and guides the vehicle to drive through a passable turning radius 404.

Figure 5:
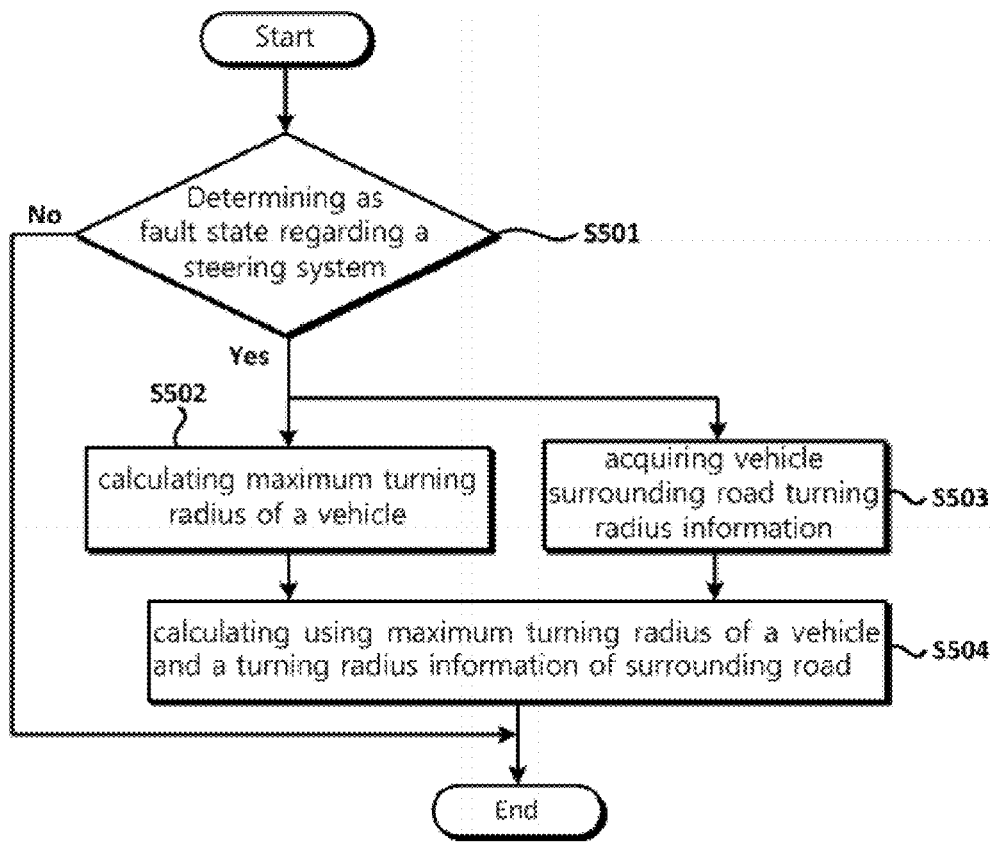
FIG. 5 is a timing chart of a operation of method for fault tolerant trajectory generation of a left-right independent active front steering vehicle according to an embodiment of the present description.

FIG. 5 is a timing chart of a operation of method for fault tolerant trajectory generation of a left-right independent active front steering vehicle according to an embodiment of the present description.

A method for fault tolerant trajectory generation of a left-right independent active front steering vehicle according to an embodiment of the present description determines when a driver inputs a steering angle through a steering wheel, whether a steering value of both side wheel that is calculated from the inputted steering angle is identical with an actually steered steering angle of both front wheel of a vehicle and when they are not identical, determines as a fault state S501.

When one side wheel steering unit is determined as a fault state, the steering system fault management unit 101 controls the steering angle of the other side wheel to satisfy the ackerman condition according to the current steering angle information of the one side wheel, and the turning radius calculating unit 102 acquires information of the fault state and the steering angle of both side wheel from the steering system fault management unit 101 and thereby calculates a maximum turning radius value of a vehicle S502.

Further, the radius information acquiring unit 103 determines current vehicle location and acquires surrounding geography and road information from various sources such as navigation, road transportation information server, stored map date and etc. based on the determined location, and acquires a minimum turning radius value of a required road to pass each road by calculating a turning radius of each road.

The optimal route calculating unit 104 determines a road that a vehicle can pass by comparing a maximum turning radius value of the vehicle acquired from the turning radius calculating unit 102 and a minimum turning radius value to pass each road that is acquired from the radius information acquiring unit 103 and, calculates an optimal driving route of a vehicle by selecting a determined passable road S504.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for fault tolerant trajectory generation of a left-right independent active front steering vehicle comprising:
  a steering system fault management unit, when determined a steering unit of one side wheel has broken down, configured to control, using a computer processor, a steering angle of the other side wheel based on a steering angle information of the one side wheel;

a turning radius calculating unit configured to calculate a maximum turning radius value of the vehicle based on a steering angle information controlled by the steering system fault management unit;

a radius information acquiring unit configured to calculate a minimum turning radius value of each road by acquiring road information of a surrounding region and driving direction of the vehicle;

an optimal route calculation unit configured to determine a vehicle passable road by comparing the maximum turning radius value that is acquired from the turning radius calculating unit and the minimum turning radius value of each road that is acquired from the radius information acquiring unit, and calculates an optimal driving route of the vehicle by selecting a determined passable road; and a display unit that displays the optimal driving route that is calculated from the optimal route calculating unit.

2. The apparatus for fault tolerant trajectory generation of a left-right independent active front steering vehicle of claim 1, wherein the steering angle of the other wheel is controlled to satisfy an ackerman condition based on the steering angle of the one side wheel.

3. The apparatus for fault tolerant trajectory generation of a left-right independent active front steering vehicle of claim 1, wherein the turning radius calculating unit further calculates a safety information of the vehicle according to each turning radius.

4. The apparatus for fault tolerant trajectory generation of a left-right independent active front steering vehicle of claim 1, wherein the radius information acquiring unit includes at least one of GPS tracking method, cell tracking method, network tracking method, and MSP hybrid tracking method to determine a location of the vehicle.

5. The apparatus for fault tolerant trajectory generation of a left-right independent active front steering vehicle of claim 1, wherein the radius information acquiring unit is configured to determine a location of the vehicle, and acquire information of surrounding geography and road from a selected at least one of navigation, road transportation information server, and stored map data according to the determined location, and calculates a turning radius of each roads.

6. A method for fault tolerant trajectory generation of a left-right independent active front steering vehicle comprising:

determining, using a computer processor, whether a steering angle value of both side wheels that is calculated from an inputted steering angle is identical with an actually steered steering angle of the both side wheels when the steering wheel angle is inputted through a steering wheel, and determines as a fault state if they are not identical;

when the fault state is determined, calculating a maximum turning radius value of the vehicle through controlling a steering angle of the other wheel to satisfy an ackerman condition according to a current steering angle information of the one side and through acquiring steering information of the both side wheels;

acquiring a minimum turning radius value to pass each road through determining location of the vehicle and acquiring information of a surrounding geography and the road based on the determined location and calculating a turning radius of each of the roads; and, calculating an optimal driving route of the vehicle through determining a vehicle passable road by comparing a maximum rotating value of the vehicle and the minimum turning radius value to pass each road and selecting a determined passable road; and displaying at a display unit the optimal driving route.

* * * * *